May 2, 1944. P. M. FARMER ET AL 2,347,943
WATCHMAN'S TOUR SYSTEM
Filed Sept. 18, 1943 3 Sheets-Sheet 1

INVENTORS
P. M. FARMER
D. W. BLOSER
BY W. C. Middleton
ATTORNEY

May 2, 1944.   P. M. FARMER ET AL   2,347,943
WATCHMAN'S TOUR SYSTEM
Filed Sept. 18, 1943   3 Sheets-Sheet 2
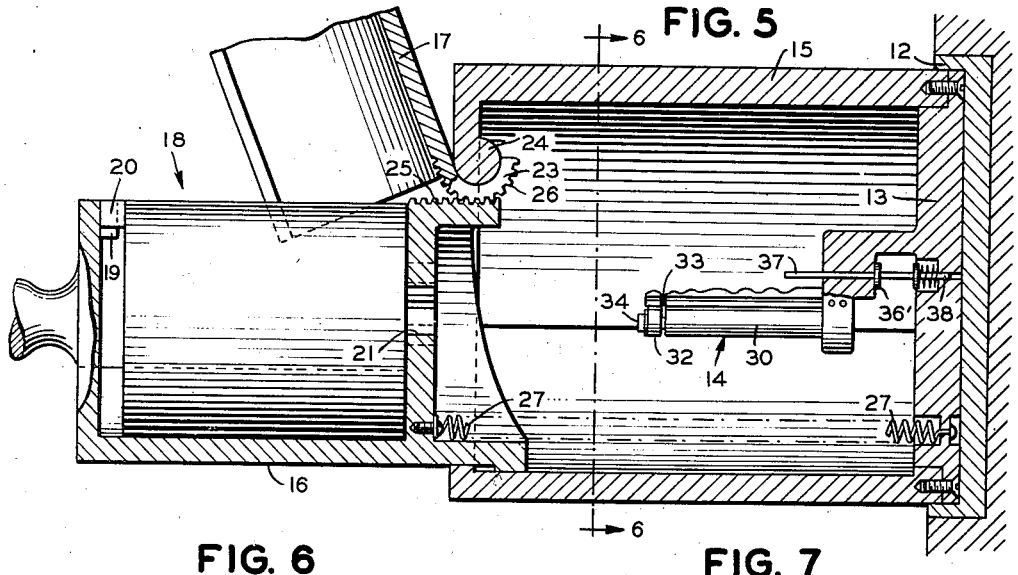
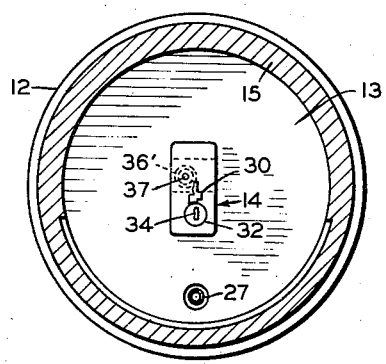 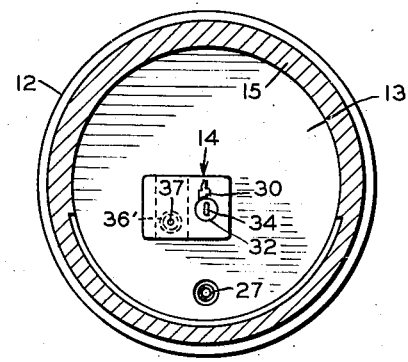
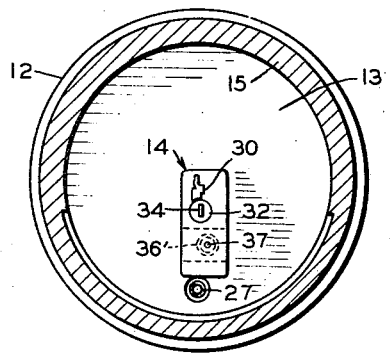 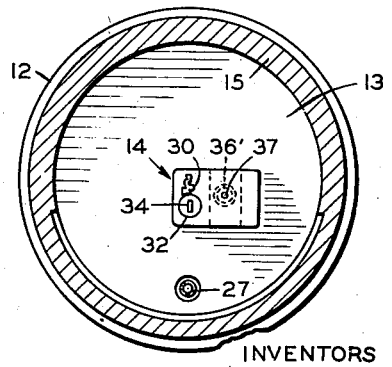
INVENTORS
P. M. FARMER
D. W. BLOSER
BY
*W. C. Middleton*
ATTORNEY May 2, 1944. P. M. FARMER ET AL 2,347,943
WATCHMAN'S TOUR SYSTEM
Filed Sept. 18, 1943 3 Sheets-Sheet 3
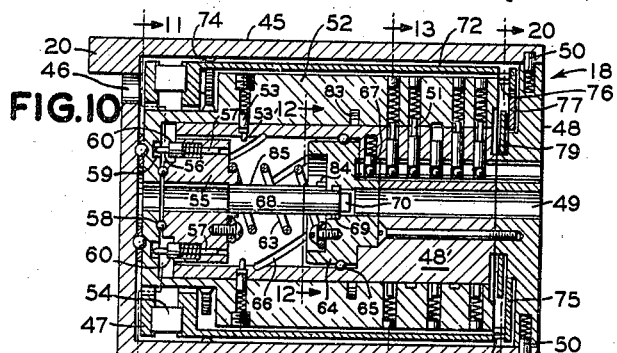
FIG. 10
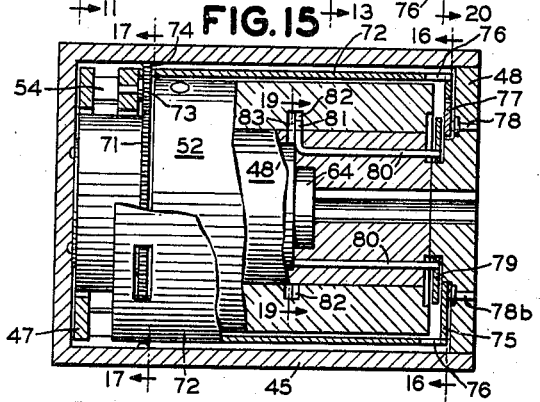
FIG. 15
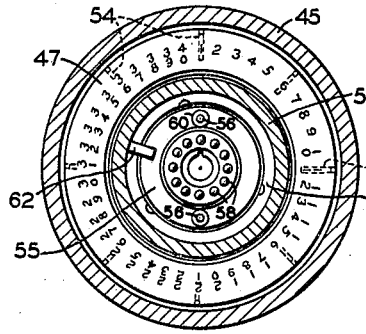
FIG. 11
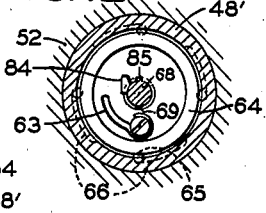
FIG. 12
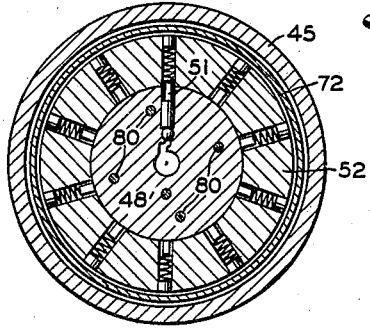
FIG. 13
FIG. 18
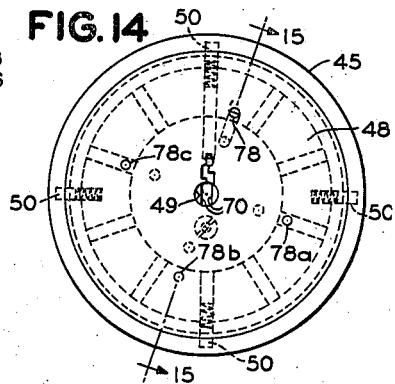
FIG. 14
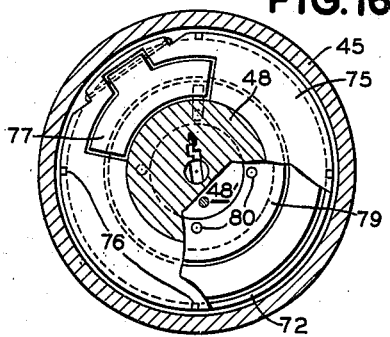
FIG. 16
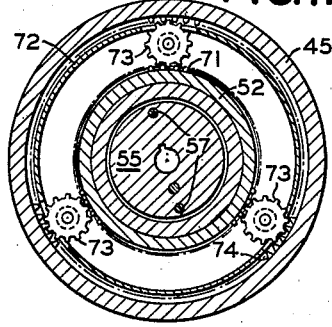
FIG. 17
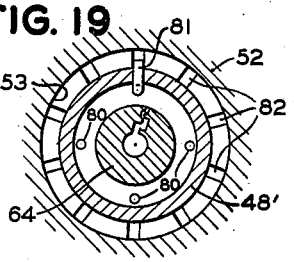
FIG. 19
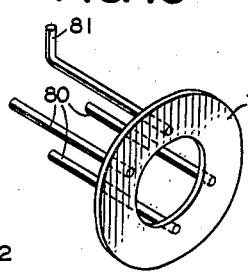
INVENTORS
P. M. FARMER
D. W. BLOSER
BY W. C. Middleton
ATTORNEY Patented May 2, 1944

2,347,943

UNITED STATES PATENT OFFICE 2,347,943

WATCHMAN'S TOUR SYSTEM

Paul M. Farmer, West Orange, and Dwight W. Bloser, Teaneck, N. J., assignors to American District Telegraph Company, Jersey City, N. J., a corporation of New Jersey Application September 18, 1943, Serial No. 502,919

18 Claims. (Cl. 177—360)

This invention relates generally to signaling systems and more particularly to signaling systems used for the purpose of supervising the activities of watchmen where it is desired that each watchman complete a prescribed tour and report to a central station at the end of the tour. This application is a continuation in part of our copending application Serial No. 386,786, filed April 4, 1941, for "Watchman's tour system."

Compulsory watchman's tour systems comprise a number of tour stations situated in different parts of a building or other enclosure for the purpose of compelling a watchman to inspect given areas at prescribed times and within a certain over-all time period. The tour station located at each end of the tour is adapted to transmit a supervisory signal to a central point; the station at one end usually indicating the start of a tour and the station at the other end indicating the finish of the tour. Each of the other stations on the tour contains a register operating member which conditions a register for operation by the next succeeding station only. Therefore the watchman carries the register from station to station and it is operated or conditioned at each station in such a manner that the watchman is compelled to visit the stations in a predetermined sequence since any deviation from the prescribed tour, such as omissions of stations or attempts to operate in a different sequence, will prevent the watchman from properly actuating the register at any other station. If the watchman has operated his register in accordance with directions, he can transmit a supervisory signal at the final station, whereas failure to operate his register in the prescribed manner will prevent the register from causing transmission of the signal at the last station on the route. The transmitting stations are adapted to control a delinquency signal, and if they are not operated by the register within a prescribed period of time, the central station operator is informed of a watchman's failure to start, or to properly cover, his route within the given time limit. Thus it is not necessary that every station be capable of transmitting report signals.

This application embodies an improvement of the invention disclosed in the application of P. M. Farmer et al., Serial No. 312,710, filed January 6, 1940, for "Watchman's tour systems." The above application discloses a watchman's tour system and a register which is particularly adapted to prevent its defeat by a watchman and to compel the watchman to follow a prescribed tour of the protected premises. This system is further adapted to prevent tampering with or manipulation of the register by the watchman in that the register gives no indication of the changes occurring therein when it is operated by the tour stations other than the numbers appearing through a window. The register also has such characteristics that it may be withdrawn from the control of the watchman and concealed within the tour box during each operation.

The register disclosed in the above-identified application was limited in its use to operation by only ten stations, but it is advantageous in some instances to increase the number of stations in an installation to a maximum of, for instance, one hundred. Therefore the register has been modified and illustrated herein to provide constructional features which permit operation on a forty-station tour, but it will be obvious to those skilled in the art that the dimensions of the register may be so proportioned that the number of stations may be increased to almost any maximum or to such a number as may be required by a particular installation in question.

Accordingly, the primary object of this invention is to provide an improved tour system which is adapted to include a large number of tour stations.

Another object of this invention is to provide a tour system comprising groups of preliminary tour stations each group being terminated by a transmitting station and a register adapted to be operated by the various preliminary stations and which differentiates between operation of various stations and between operation of the various groups to compel operation at all of the stations in a predetermined order.

Still another object of this invention is to provide a watchman's tour system having groups of preliminary tour stations, each group being terminated by a transmitting station and the keys of corresponding stations of each group being identical.

A further object of this invention is to provide a register which is adapted to be operated by a number of preliminary stations and a number of groups of preliminary stations but which differentiates between operations by each group of preliminary stations.

A still further object of this invention is to provide a compulsory watchman's tour system comprising groups of preliminary stations, each group being terminated by a transmitting station and each group having a similar set of register operating keys and a register adapted to be operated by each of the preliminary stations but which distinguishes between operation by the various groups without requiring a large number of distinctive station keys.

Still another object of this invention is to avoid the necessity of providing a distinctive key for every tour station in a watchman's tour system by providing a register which distinguishes between groups of tour stations.

A still further object of this invention is to provide a tour system utilizing groups of distinctive keys and a register which must be operated by the groups of keys in succession and which distinguishes between operations by the various groups.

Another object of this invention is to provide in combination a watchman's tour system, the stations therein being divided into groups as regards the keys therein, the keys of corresponding stations of each group being identical, the stations therein being further divided into the same or different groups, each group being terminated by a transmitting station, and a register adapted to be operated by each station and to operate each transmitting station in a predetermined sequence regardless of the location within the key groups of the transmitting stations.

A further object of this invention is to provide a register in a watchman's tour system which is so constructed that it presents the advantages of that shown and described in the above-identified application and which may be operated by a greater number of tour stations.

Further objects and advantages of this invention will be apparent to those skilled in the art from consideration of the following specification taken in connection with the accompanying drawings wherein:

Fig. 5 is an elevation in section of a preliminary tour station;

Figs. 6 to 9 are sections of the station shown in Fig. 5 taken on line 6—6 to show the angular position of the pin member 37 with respect to the key for each group of preliminary stations;

Fig. 10 is an enlarged elevation in cross section of the register;

Fig. 11 is a cross section of Fig. 10 on line 11—11;

Fig. 12 is a cross section of Fig. 10 on line 12—12;

Fig. 13 is a cross section of Fig. 10 on line 13—13;

Fig. 14 is an end view of the register;

Fig. 15 is a partial cross section of the register with parts broken away to show the interior construction and taken on line 15—15 of Fig. 14;

Fig. 16 is a cross section of Fig. 15 taken on line 16—16;

Fig. 17 is a cross section of Fig. 15 taken on line 17—17;

Fig. 18 is a perspective of the collar and attached pins shown in Figs. 10 and 15;

Fig. 19 is a cross section of Fig. 15 on line 19—19;

Figure 1:
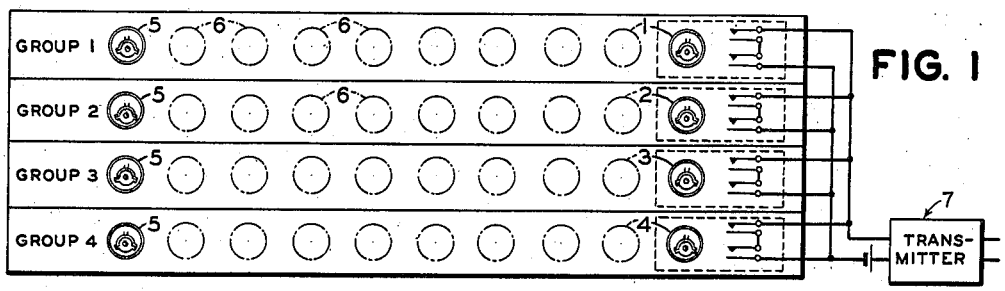
Fig. 1 illustrates diagrammatically a watchman's tour system designed in accordance with this invention.

The watchman's tour system includes, in accordance with this invention, a plurality of tour stations shown in Fig. 1, the transmitting stations being indicated at 1, 2, 3 and 4, the intermediate stations being indicated at 5 and 6. The stations are situated at different locations along the watchman's route whereby, as the watchman progresses along the route, his register, such as that shown in Figs. 3 and 10 to 21, is conditioned by each station in a predetermined manner. The system may include, for example, 40 stations, as illustrated in Fig. 1. It is necessary in systems of this type to compel the watchman to progress from one station to another operating his register at the transmitting and intermediate stations 1 to 6, respectively, in predetermined order so that he is always forced to patrol a predetermined tour. The register remains in transmitting station 4 between tours and at predetermined times he withdraws the register from station 4, thereby transmitting a report signal and indicating that the tour is started on time. As the watchman proceeds, the register is operated by each of the intermediate stations 5 and 6 in a progressive manner so that it is in condition at each successive station to be operated by that station only and at every tenth station the register is in condition to operate a particular one of the transmitting stations 1 to 4 which controls a transmitter 7 from which a supervisory signal is transmitted to a central point where it is recorded or otherwise indicated by any suitable recording or indicating device. If the watchman fails to operate his register by visiting the tour stations in the prescribed sequence, or if he omits a tour station, the register will not be in condition to operate a transmitting station and since he is given a predetermined amount of time to complete the tour, he will fail to transmit a supervisory signal before the expiration of that time, and the attendant will be informed of his failure by a delinquency signal, as is well-known in the art.

Stations 5 and 6, shown in Fig. 1 of the drawings, are known as preliminary stations and an example is shown in Figs. 5 to 9. The station includes an anchoring base 12 which is secured to a supporting wall by screws or any other suitable fastening means, which are not shown. Care is taken, however, to so fasten the base 12 to the wall and plate 13 to base 12 that special tools are necessary to remove the station box from the wall or to disassemble it.

A plate member 13 is supported on the base 12 and has a casing 15 attached thereto. The casing member encloses and supports a cylindrical drawer 16 having a top or cover 17 and a bottom portion for receiving the register 18 shown in Figs. 3 and 10 to 21. The end of the drawer 16 is provided with lug 19 for engaging the slot between lugs 20 on register 18 for positioning the same in operative relation to the key hole 21. When the register is inserted in the drawer, it is still possible to grasp the same and withdraw it as the top of the drawer extends below the center line of the register, as shown at 8 in Fig. 2. The top or cover of the drawer has a lug portion 23 which meets the top of the casing at the point 24 when the drawer is opened. The upper rear portion of the drawer is provided with a rack 25 which engages with the pinion 26 on lug 23 so that when the drawer is almost entirely open the cover 17 is automatically opened. It should be noted that the cover of the drawer cannot be opened until the drawer is substantially completely withdrawn, thereby preventing the watchman from observing the characteristics of the key and the interior of the station. It is intended that any suitable means may be provided for opening the cover so long as it operates to keep the cover in closed position until the drawer is substantially open. Complete withdrawal of drawer 16 is prevented when the flanges on the bottom portions of the drawer 16 and casing 15 engage one another, as indicated in Fig. 5.

The member 13 supports a key 14 which is aligned in such a position that the register engages therewith when the drawer is returned to its closed position, the key 14 being so cut that it will unlock the register only if the predetermined previous station has been visited by the watchman. The spring 27 is provided for the purpose of maintaining the drawer in its closed position except when the watchman forcibly withdraws the same for the purpose of inserting his register. The preliminary stations include the structure recited above, as is described in the application of P. M. Farmer, D. W. Bloser and W J. Kleinknecht for "Watchman's tour system," Serial No. 312,710, filed January 6, 1940. It will be evident from subsequent description that it is not necessary that every key in a forty station system be differently cut as the register is adapted to be operated by four sets of ten keys, the respective keys in each set being identically cut.

The preliminary stations 5 and 6 also include collar 36' and pin 37, biased to the left by a spring surrounding pin extension 38, the purpose of which will appear later. Figs. 5 and 6 indicate the position of pin 37 in group 1 of the tour stations while Figs. 7, 8 and 9 illustrate the positions of this element in groups 2, 3 and 4, respectively.

Figure 2:
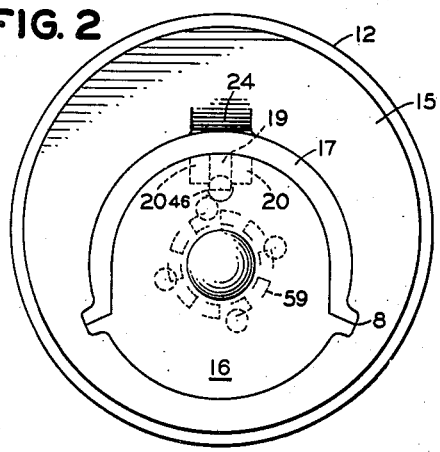
Fig. 2 is an end view of a preliminary tour station.
Figure 4:
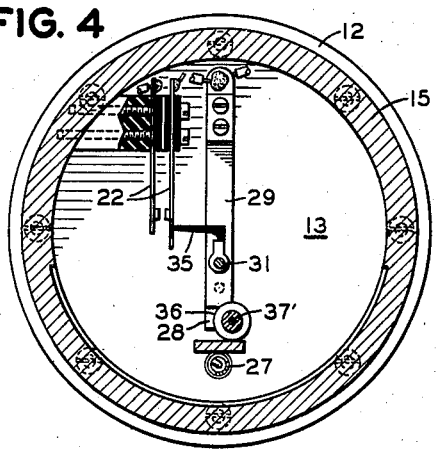
Fig. 4 is a section taken on line 4—4 of Fig. 3.
Figure 3:
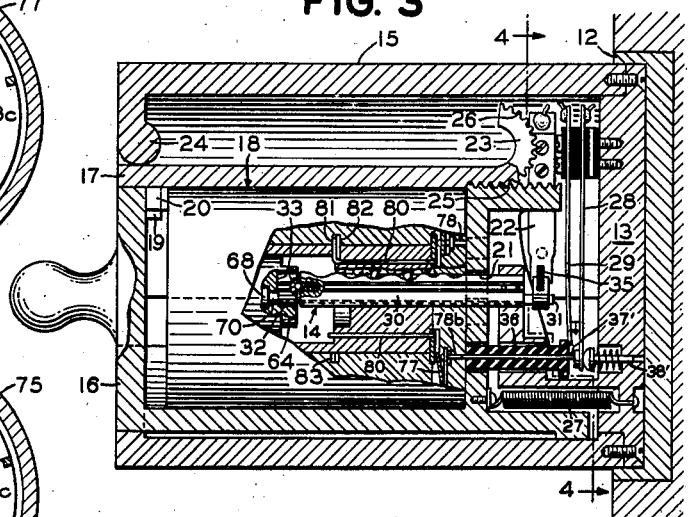
Fig. 3 is an elevation in section of a transmitting tour station with the register in its operated position and partially broken away to show the key.

The transmitting stations 1 to 4 are shown in detail in Figs. 2, 3 and 4 and are similar to the preliminary stations except that the base member 13 supports transmitting contacts 22 and switching contacts 28 and 29. The key 14, shown in detail in Figs. 3 and 5, includes a fixed portion 30 which is attached to the base member 13, a shaft 31 rotatable within the key, a portion 32 freely rotatable about shaft 31, shown in Fig. 3, which is normally locked by the spring-pressed ball 33, and an operating lug portion 34. The shaft 31 is secured to a contact operating member 35 whereby rotation of the lug and shaft 31 causes operation of the transmitting contacts 22, the purpose of which will be fully explained in connection with the operation of the register. Spring-pressed pin 38' normally abuts the end of contact spring 28 without exerting pressure on it. The pin 37' abuts spring 28 on the other side, and contact spring 29 normally holds sleeve 36 of insulating material in its outermost position. Pin 37' is shown for purposes of clear illustration in the position which it would have in transmitting station 3. Contact springs 28 and 29 are adjusted so that they are normally open, making it necessary for insulating sleeve 36 to be forced to the right against the pressure of spring 29 before closure of contacts 28 and 29 can occur. The reason for this arrangement will also be more fully described in connection with the register. The transmitting stations or boxes are similar to the preliminary boxes in all respects except that the preliminary stations are not provided with contacts.

Figure 21:
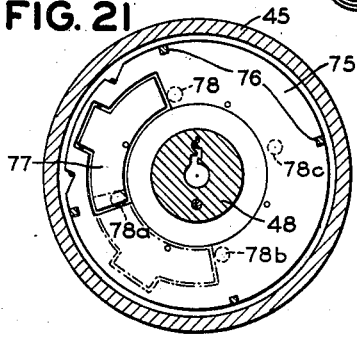
Fig. 21 is a view similar to that shown in Fig. 20 taken after the register has been operated by ten stations.

The register 18, shown in Figs. 10 and 21, includes an outer cylindrical casing 45 which has lugs 20 integral therewith and an aperture 46 which exposes a station indicator ring 47 for the purpose of revealing the number of the previously operated station. It should be noted here that in contrast to prior registers the outer casing of this register does not present any indication of the manner in which the register operates, thus preventing the watchman from obtaining any clue as to the operating procedure which takes place within the register as he progresses from station to station. The other end of the cylinder is closed by a disc 48 which is pinned permanently to the casing 45 by the pins 50 so that it cannot be removed to expose the inner parts of the register. Inner cylinder 48' is rigidly secured to disc 48 by the screw as shown. Key slot 49 extends through disc 48 and cylinder 48' but it differs from the usual cylinder lock in that the key slot does not change position when a key is inserted. These features of construction prevent the watchman from obtaining any hints as to how he might alter the register for the purpose of avoiding operation of the tour stations in order to transmit his report signal.

The lock portion of the register consists of the inner cylinder 48' and a set of key operated pins for operating a plurality of sets of pins 51 in an intermediate cylinder 52 which lock the intermediate cylinder to the inner cylinder. Only ten sets of locking pins 51 are provided, the sets being disposed in cylinder 52 as shown in Figs. 13 and 14. The lock portion of the register is arranged to require a different key for operating each set of pins 51. Thus, in the example shown, four pins are effective to lock the cylinder but in the other stations, for example, a different combination of three or four pins may be effective to lock the cylinders. Thus, any desired combination of pins 51 may be utilized with the result that each of the first ten stations has a different key and the watchman must visit the stations in predetermined sequence without omitting any station or stations.

In a forty station tour system, the keys of corresponding stations of the respective groups may be identical as will be evident from subsequent description.

The pins 51 are designed to be loose fitting, while another pin 53 extending between cylinders 48' and 52 is designed to be close-fitting so that if an attempt is made to pick the lock, it will be impossible to jam each of the pins 51 in position to unlock the cylinders.

Figure 20:
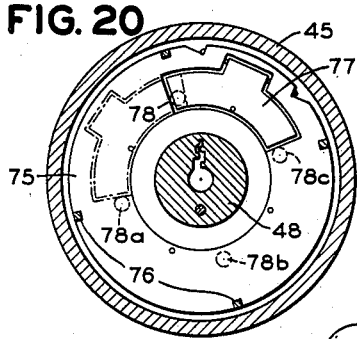
Fig. 20 is a cross section of Fig. 10 on line 20—20.

The watchman's tour system disclosed in application Serial No. 312,710, mentioned hereinbefore, has been improved upon to provide a system which includes a substantially unlimited number of tour stations by adding a further locking device which is described in the following. In addition to the other locks the projecting portion 81 of pin 80 rests in one of ten slots 82 of intermediate cylinder 52, as shown in Figs. 15 and 19, whereby the cylinders 48' and 52 are still in a locked condition unless the projecting portion 81 has been moved into a circular groove 83 which is cut in the intermediate cylinder 52. This unlocking function is accomplished by means of a driving mechanism which is controlled by rotation of intermediate cylinder 52. The intermediate cylinder 52 is provided with a series of gear teeth 71 around its periphery at the left hand end for driving the station cylinder 72 through any desired number of gears 73 attached to the end portion of station cylinder 72. The gears 73 engage another gear 74 on the inner portion of the outer casing of the register, gears 71, 73, 74 having such a ratio to one another that the station cylinder 72 will be rotated through one revolution to four revolutions of the intermediate cylinder 52. A disc 75 is attached to cylinder 72 for rotation therewith by pins 76 and a hinged member 77 is pinned to the disc 75 in position to be engaged by one of the pins 78, 78a, 78b and 78c. There is one pin for each group of ten tour stations whereby as the station cylinder is rotated through one quarter of a revolution by each group of ten tour stations, the hinged member 77 engages a different one of the pins 78, 78a, 78b, 78c for each group of ten tour stations. These pins are arranged 90° apart, as shown in Figs. 14, 20 and 21, and are adapted to be engaged one at a time by one of the pins 37 or 37' at each tour station. The pins 37 and 37' are located in different angular relation with reference to the key for each group of stations whereby the register may be operated only in the particular group. Figs. 6 to 9 of the drawings illustrate the location of pin 37 or 37' in groups 1 to 4 respectively.

The hinged member 77 is allowed to operate by a collar member 79 having the four pins 80 attached thereto as shown in Fig. 18, the pins 80 projecting through the inner cylinder 48' to engage the winding member 64.

The unlocking mechanism includes an inner cylinder 48' which encloses a driving member 55 which rides on bearings 58 and carries a number of round rod-like pawls 56 on the ends of shoulders 60 secured to spring-pressed pins 57. Due to the springs, the pawls are maintained in contact with ratchet teeth 59 (shown in dotted lines in Fig. 2) on the intermediate cross axial face of cylinder 52. Such engagement prevents rotation of driving member 55 prior to movement of pins 53 to positions unlocking cylinder 52 for rotation relative to cylinder 48'. Unlocking of pins 53 is accomplished by winding member 64 engaging and forcing pins 53' outwardly to the proper extent. Thus rotation of driving member 55 is prevented until the spring 63 has been wound by member 64 which not only winds spring 63 but also at the proper time clears pins 53 to unlock driving member 55, with the result that cylinder 52 is rotated under the impetus of spring 63.

As shown in Fig. 2 the ratchet teeth 59 are ten in number, one for each preliminary station whereby the intermediate cylinder 52 can be stepped through ten positions. If each position differs from adjacent positions either in number or disposition of pins 51, the intermediate cylinder will advance one station at a time, or through an arc of 36°, arrest of the intermediate cylinder at the end of the arc being accomplished by one or more of the pins 51 at the new position dropping into a pinhole or pinholes in the inner cylinder in which hole or holes the pin or pins had not been elevated by the key. In the event the system is to be used with less than ten stations in each group, for example with nine stations in each group, then a pair of adjacent positions will have similar pin number and dispositions to, in effect, eliminate one of the normal ten positions in each group. If used with eight stations in each group, then two pairs of adjacent positions will be so arranged. This elimination of stations, or compensation for a reduced number of stations in each group can be extended within limits, bearing in mind always that each group must have the same number of stations as every other group. In any event the greatest arc of movement of the intermediate cylinder under correct operating conditions is 72°, and any appreciable movement in excess of two positions is prevented by the provision of a stop 62 (Fig. 11) extending from the end of inner cylinder 48' into the path of movement of one of the flanges 60. This stop is disposed at approximately 74° from a vertical line through the device, thereby preventing such excess movement as might possibly disrupt the operating mechanism.

The inner cylinder 48' encloses the winding spring 63 for operating the driving member 55 which spring is wound by the winding member 64, this member being provided with ball bearings 65 which ride in helical slots 66 causing the spring winding member to rotate and wind the spring 63 as it is moved to the left. As an added precaution to prevent insertion of a pin of some sort to force a winding operation of the winding member, the pin 67 is provided so that the winding member 64 cannot move with respect to the inner cylinder 48' unless unlocked by the rotatable portion 32 of key 14.

The driving member 55 has a shaft 68 keyed thereto by key 85 and secured to winding member 64 by flange 69, there being a slot 70 in the end of shaft 68 for engaging the lug 34 on the transmitter shaft 31 to operate the transmitting station when the proper tour has been completed. Winding member 64 is provided with lug 84 for engaging with key 85 on shaft 68 for the purpose of causing rotation of shaft 68 and driving member 55 from the operated position back to normal position, as will be explained later on.

The ring 47, having station numbers thereon, is supported by the flat springs 54 for the purpose of allowing movement of the ring in case the watchman attempts to change the station indication. Thus, he can insert a pencil or the like through aperture 46 and displace the ring 47, but upon withdrawal of his pencil the ring returns to the proper positions and in the meantime intermediate cylinder 52 is not moved or otherwise affected as no appreciable force can be exerted thereon.

It will be assumed that the watchman inserts the register in the drawer of a preliminary station, such as 5 in group 1, thus engaging the key with the register. He cannot perform any operation except the insertion of the register in the drawer and the return of the drawer to its normal position and therefore cannot force the operation of the register in any manner except the proper one. Furthermore, the register is completely concealed and he cannot obtain any hint as to the operation taking place.

The key 14, in the case of a preliminary station, enters the key slot 49 and the rotating portion 32 of key 14 operates the pin 67 which unlocks the spring winding member 64. It is to be noted here that the conventional key blank cannot be utilized to operate the register because even though a key blank could be found which would fit the slot 49 and even though it could be filed to operate the pins 51, it would not operate the winding member 64 as it would not have a rotating end portion. Further movement of the drawer inward causes rotation of the winding member 64 under the influence of the balls 65 and helical slots 66. The spring 63 is wound until the winding member 64 is forced against the pins 53', causing locking pins 53 to be released by winding member 64. It should be noted that the closely fitting pins 53 securely lock the inner cylinder 48' to the intermediate cylinder 52. Thus, even though a watchman succeeded in moving each of the pins 51, he could not jam these pins in their unlocking position since they are loose fitting and pins 53 are tight fitting.

The cylinder 52 cannot rotate until all of the pins 51 and 53 are in position to unlock the two cylinders, and the driving member 55 cannot start its rotation until the pins are in the unlocking position. Therefore, the pins 51 and 53 are so positioned with respect to one another and the key for the winding member 64, that the key unlocks pins 51, the winding member 64 engages and moves pin 53', and consequently pins 53, so that the ratchet, engaged by the pawls 56, can rotate under the drive imparted by wound spring 63 at the instant that the two cylinders 48' and 52 become unlocked with respect to each other except for the locking function of portion 81 of pin 80. If the register has been properly operated, pin 78 will have engaged the pin 37 in the preliminary station 5 of group 1, the spring-pressed pin 37 exerting pressure on pin 78. The hinged portion 77 will be in the approximate position shown in Fig. 20 in solid lines and will therefore be engaging the pin 78 to transmit pressure to the collar 79 and pins 80. If the proper key had operated the winding member 64, pins 80 will be allowed to move to the left whereby the portion 81 will move into the circular groove 83 in the intermediate cylinder 52. Thus, the lock of the register is completely unlocked. At this time the spring 63 has been wound and rotates the intermediate cylinder 52 until a new set of pins 51 and 53 become aligned with the key slot on the inner cylinder 48'. This new set of pins is made up of a different combination and corresponds to the next preliminary station whereby its key is required to perform the unlocking function. This is true for the reason that the hinged member 77 has only been rotated a few degrees by the gears 71, 73 and 74 so that a pin 37, in the angular position shown in Fig. 6, must still operate pin 78.

When the register is relocked and the drawer 16 is withdrawn by the watchman, the spring winding member 64 returns to its normal position under the influence of spring 63. As the winding member 64 returns to its normal position, the lug 84 on member 64, shown in Figs. 10 and 12, engages with the keyed portion 85 of shaft 68 to in turn rotate the driving member 55 back to its normal position in preparation for operation by the next tour station, the pawls riding over the sloping surfaces of the next teeth to finally be seated behind the shoulders of those next teeth. At this time portion 81 enters the next slot 82 whereby pin 78 must function again at the next station.

The watchman progresses along the tour, resetting the register in each tour box by changing the setting of the intermediate cylinder, as described above. If he fails to visit one or more boxes or to operate the register at the boxes in the predetermined sequence, the key at the next box will not unlock the intermediate cylinder and consequently the ring 47 always indicates the number of the last station to operate the register.

The watchman's tour system has been illustrated in Fig. 1 as comprising forty stations divided into groups of ten stations each, each group having a transmitting station 1, 2, 3 or 4, whereby the watchman transmits a supervisory signal at every tenth station. Obviously, the number of stations may be decreased in accordance with the needs of a particular installation.

The preliminary stations 5 and 6 in the first group, for instance, operate the register as described heretofore and as the intermediate cylinder 52 rotates at each station, it in turn rotates the station cylinder 72 through the gears 71, 73 and 74 at the rate of one revolution for every four revolutions of the intermediate cylinder. Thus, as shown in Fig. 20, the hinged member 77 engages pin 78 at station 1 and rotates almost 90° during operation by the first ten preliminary stations. When the register is inserted in the tenth station or the first transmitting station, the pin 37', similar to that shown in Fig. 3, exerts pressure on the pin 78 and the hinged member 77. If the register has been operated at the preliminary stations in predetermined sequence, it is set to be in the proper position for the key at the transmitting station to unlock the intermediate cylinder and also to move the winding member 64, thereby allowing the collar 79 and pins 80 to move to the left. When the pins 80 move to the left, projecting portion 81 moves out of notch 82 into a circular groove 83 which is cut in the intermediate cylinder 52. Thus, the pin 78 is allowed to recede into the register and pin 37' of the transmitting station remains in its normal position while sleeve 36 is forced to the right sufficiently to close the contacts 28 and 29, thereby preparing the transmitting circuit.

Thus when the register is inserted in the of a transmitting station, it allows the contact operating member 37' to remain stationary while the sleeve 36 is displaced and closes contacts 28 and 29 as shown in Fig. 3. If, however, the watchman plugs the aperture in the drawer or inserts any sort of instrument through the aperture in the drawer to operate the contacts 28 and 29, he will push both of the members 36 and 37', thereby displacing both contacts simultaneously in open relation to one another and preventing transmission of a report signal.

When the register becomes unlocked at the transmitting station, the winding member 64 and cylinder driving member 55 are operated in the same fashion as in a preliminary box except that the keyed shaft 68 rotates the key shaft 31 through the connection established when the lug at the end of shaft 31, shown in Fig. 3, engages the slot 70 in shaft 68. Rotation of key shaft 31 operates the member 35 to close contacts 22 to thereby transmit a report signal. The contacts 22, 28 and 29 are shown as being normally open but it will be obvious to those skilled in the art that they may be normally closed and opened by the members 35 and 37'. It should be noted here that springs 76 allow the cylinders to rotate even though pin 78 prevents rotation of disc 75 at this particular point. When the register is withdrawn from the station, pin 78 resumes it normal position and disc 75 assumes its proper position so that 77 engages 78a.

When the register is operated by the next preliminary station, the hinged member 77 will have been rotated sufficiently to become disengaged from pin 78, as shown in Fig. 21, and will engage pin 78a which is displaced 90° from pin 78. As mentioned heretofore, the pins 37' at the transmitting stations are displaced 90° with respect to each other and therefore the register must be operated at the transmitting station where the proper pins are in alignment, in this case at the twentieth station. If an attempt is made by the watchman to skip the twentieth station and operate the thirtieth station, no signal will be transmitted since pin 78c cannot be displaced sufficiently to permit closure of contacts 29. The reason for this is that pin 78c is prevented from receding into the register by the disc 75, as indicated in Fig. 15. This is also true of pins 78 and 78b.

After stations 11 to 19 have been visited by the watchman the register will have been operated to such a position that operation at station 20 will find the hinged member 77 in the position indicated in Fig. 21 of the drawings. Pin 78a therefore will be permitted to recede within the register under the pressure exerted by the pin 37' within the transmitting station and the portion 81 of pin 80 which is attached to collar 79 can move out of the notches 82 into the slot 83 in intermediate cylinder 52.

At station 21 of the tour the station cylinder and disc 75 will have rotated through a sufficient angle so that pin 78a will no longer engage the hinged member 77 and this member will engage tha pin 78b as shown in Fig. 3. This engagement will continue through the operations at stations 22 to 30, station 30 being another transmitting station. If these stations are operated in the prescribed order, the key 14 at the transmitting station 30 will unlock the register cylinders and operate the transmitting contacts 22. As in the previous instances, pin 37' at the transmitting station will engage with pin 78b to thereby close the transmitting circuit. At station 31 the hinged member 77 will have advanced to such a position that it engages pin 78c, which engagement continues through the operation of stations 32 to 40. At station 40 another transmitting operation will occur if the predetermined preliminary stations have operated the register in the prescribed order.

The disposition of the parts controlling the contacts 28 and 29 in the transmitting station is shown for one representative station in Fig. 4. This figure represents transmitting station 3, and it will be understood that parts 28, 29, 36 and 37' will be arranged in similar order at the other stations but at 90° displacement from one station to the next.

This invention has been illustrated by way of an example showing the forty station tour system comprising groups of ten stations to a group. It is not intended that this invention shall be limited to such a system, as the number of pins 78 determines the number of groups to be included in each system. Thus, a five-group system will have five guide pins 78 and the inner cylinder 48' would have a number of slots 82 cut therein corresponding to the number of stations in the group. The gear ratio between gears 71, 73 and 74 may be adjusted to rotate hinged member 77 through whatever angle is necessary to distinguish between successive groups of stations. Provision of these features of the invention makes it possible to divide a tour system into substantially any number of groups of stations and to include substantially any number of stations within each group.

The keys in any group may always correspond to the respective keys in the other groups even though any desired number of groups of stations is provided.

The transmitting stations need not be located at any particular point within a given group of tour stations as any station may be provided with the key operated contacts for preparing a transmitting circuit and operating such a circuit. Thus, if a subscriber for watchman's tour service has seven or eight buildings to be protected, the system might include five or six groups of tour stations and yet there could be a transmitter in each of the protected buildings.

From the description set forth herein, it is evident that the register is so designed that its appearance other than the ring 47, does not change as a consequence of the operations which are performed on it during the tour. Thus the watchman does not see a change in the appearance of the register and, furthermore, he cannot discover that the pins 78, 78a, 78b or 78c have any functions. He is also prevented from defeating the purpose of the pins themselves as they are held in normal position by the disc 75. The lock cannot be operated by a conventional key, and it cannot be picked in view of the dimensions assigned to the pins 51 and 53. In addition, the watchman loses control of the register as he closes the drawer of the station box and therefore he is prevented from forcing the register to accomplish any false operation thereof. In other words, the register is substantially self-operating.

The station boxes are so designed that when the drawer is pulled to an open position, the cover remains closed and cannot be opened until substantially the open position is reached, and therefore the interior of the box including the key and the guard pins always remains concealed. Therefore, it is impossible for the watchman to obtain any hints as to the appearance of the key itself or of the remainder of the interior of the box. The drawer protects the register from any application of force while it is being operated by the key and also conceals the register to prevent the watchman from ascertaining the function of the pins 78 as well as the operations which occur within the register.

In addition to the above enumerated advantages, this invention alters the register disclosed in the heretofore identified application to provide operation by a large number of tour stations limited only by physical dimensions without expensive or fundamental changes in the mode of operation. All of the advantages obtained by the particular lock construction are retained and the guard pins still provide protection to prevent transmission of signals unless the proper tour has been completed.

In other words, the watchman is required to visit every station in his tour, as failure to do so would cause a delinquency signal in the central station and any tampering with the register or tour boxes cannot prevent a delinquency signal.

It is not intended that the invention shall be limited to any particular form of transmitter, as it will be plainly evident to any person having ordinary skill in the art that other transmitters may be used, such as those adapted to transmit a code signal comprising a series of digits. Furthermore, it is not intended that this system shall be limited to any specific ratio of transmitting tour stations to preliminary tour stations, as the requirements of individual installations will determine the number of the various types of stations to be included within a specific system. It is further obvious that this invention can be adapted to any number of sets of locking pins and the required number of keys for operating them.

It should be understood that certain details of construction have been omitted to avoid unnecessary complication of illustration, as it will be obvious to those skilled in the art that certain parts of this invention may be changed to facilitate their assembly.

While the system has been described as having tours with transmitting stations at the ends of the tours and with preliminary stations therebetween, it will be evident to those skilled in the art that transmitting stations can be interspersed in the tour as may be desired and as conditions may require.

Various modifications of this invention and improvements thereof will occur to those skilled in the art, and therefore we desire that this invention shall not be limited except as required by the prior art and the scope of the appended claims.

What is claimed is:

1. In combination, a watchman's tour register comprising an outer casing, an inner cylinder therein, an intermediate cylinder concentric with said inner cylinder, a plurality of sets of locking pins extending between said inner cylinder and intermediate cylinder for locking them together, an operating device for rotating the intermediate cylinder with respect to the inner cylinder as each set of locking pins release the cylinders, an auxiliary locking pin extending through one end of said inner cylinder into engagement with said operating device and said intermediate cylinder to lock said cylinder when it is in one position and unlock it when it is in another position, a station cylinder driven by the intermediate cylinder in a 1:4 ratio, a disc on the station cylinder and rotated thereby, a movable hinged sector in said disc, guard pins angularly displaced relative to each other and extending through said casing to engage said disc and hinged sector whereby any guard pin in engagement with said sector may be operated to move said sector, means connected to the auxiliary locking pin and engaging said hinged sector whereby motion of said sector is transmitted to the auxiliary locking pin, and keys for operating said operating device to allow movement of said auxiliary locking pin to its unlocking position and operate said sets of locking pins for unlocking the intermediate and inner cylinders whereby said cylinders assume consecutive locked positions.

2. In combination, a watchman's tour register comprising an outer casing, a rotating cylinder lock therein, a pin for unlocking said lock, a station cylinder geared to and rotated by the lock in such a ratio that the station cylinder rotates through ninety degrees for one revolution of the lock, four guard pins disposed with equal relation to each other and extending through one end of the casing, a disc on the station cylinder in engagement with the guard pins and retaining certain of them in locked position, a movable hinged sector in the disc which successively engages each of the guard pins when the lock is operated through successive revolutions and a collar engaging the hinged sector and the unlocking pin for unlocking the lock in response to movement of the sector and whichever guard pin is adjacent thereto, and keys for unlocking the lock and rotating it to render successive guard pins operative.

3. In combination, a watchman's tour register comprising an outer casing, a rotatable cylinder lock therein, means in said lock for rotating it through successive locked positions, an auxiliary locking device extending through one end of said lock into operative relation with said rotating means and the cylinders of said lock to lock said cylinders when it is in one position and unlock them when it is in another position, a cylinder rotated by the cylinder lock in a 1:4 ratio, a disc on the said cylinder, a movable portion in said disc, guard pins extending through one end of said casing to engage said disc whereby any guard pin in engagement with said movable portion may be operated to move said portion, and means connected to the auxiliary locking device and engaging said movable portion whereby motion of said portion is transmitted to the auxiliary locking device, and keys for operating said rotating means to allow movement of said auxiliary locking device to its unlocking position and operating said lock.

4. In combination, a watchman's tour register comprising an outer casing, an inner cylinder locked thereto, an intermediate cylinder concentric with said inner cylinder, a plurality of sets of locking pins angularly displaced with respect to one another and extending between said inner cylinder and intermediate cylinder for locking them in a plurality of successive positions and through successive cycles of locked positions, an operating device for rotating the intermediate cylinder with respect to the inner cylinder through said successive locked positions, an auxiliary locking device extending into engagement with said operating device and said cylinders to lock said cylinders when it is in one position and unlock them when it is in another position, a selector driven by the lock in a 1:4 ratio whereby one cycle of selector operation occurs during four cycles of lock operation, a disc on the selector rotated thereby, a movable portion in said disc, guard pins disposed at an equal angle relative to each other and extending through one end of said casing to engage said disc therein whereby a certain guard pin is in engagement with said movable portion during each cycle of lock operation, and means connected to the auxiliary locking device and engaging said movable portion whereby motion of said portion is transmitted to the auxiliary locking device, and keys for operating said operating device to allow movement of said auxiliary locking device to its unlocking position and operate said sets of locking pins for unlocking the intermediate and inner cylinders whereby said cylinders assume a consecutive locked position.

5. In combination, a watchman's tour register comprising a cylinder lock operable through a number of cycles of successive locked positions, an auxiliary locking means for locking the lock when the auxiliary device is in one position and unlocking the lock when said device is in another position, a selector operated by the lock through one cycle of operation during four cycles of lock operation, guard means in engagement with said selector and angularly disposed in such a manner that a certain one of said guard means is in engagement with said selector during each cycle of lock operation, and means connected to the auxiliary locking means and engaging the selector whereby operation of a certain guard means is translated into operation of the auxiliary device and keys for also unlocking said lock when the proper guard pin is operated.

6. In combination, a watchman's tour register comprising a lock operable through a number of successive locked positions, an auxiliary locking means for operating said lock, guard means for operating said auxiliary locking means, a selector operated by the lock for determining which of said guard means shall be effective and keys for also unlocking said lock when the selected guard means is operated.

7. In a watchman's tour system, a register comprising an outer casing and an inner cylinder locked thereto, an intermediate cylinder operated by said inner cylinder, sets of pins engaging said cylinders to lock them in a series of successive positions, groups of keys for unlocking the cylinders in successive cycles, an operating device operated by each group of keys for rotating the intermediate cylinder with respect to the inner cylinder through each series of locked positions, a station cylinder geared to and driven by the intermediate cylinder in a one to four ratio whereby said station makes one revolution for four revolutions of said intermediate cylinder, a number of guard pins corresponding to the number of groups of keys disposed with angular relation to each other and extending through one end of the casing, a disc on the station cylinder for engaging and retaining certain of the guard pins in locked positions, a movable hinged sector in the disc which engages a predetermined guard pin during operation of the intermediate cylinder by a predetermined group of keys, a collar engaging the hinged sector and controlled by the sector and guard pin during operation by the predetermined group of keys, and auxiliary locking means connected to said collar and engaging the inner and intermediate cylinders to lock them together until said collar is operated.

8. In a watchman's tour system, groups of keys, a register comprising a cylinder lock, said lock being operatable in a series of successive positions in successive cycles under the control of said keys, sequencing means driven by said lock, a number of guard means corresponding to the number of groups of keys, said guard means being sequentially rendered operatable by said sequencing means, and means for also locking said lock and unlocking said lock under the control of said guard means whereby each of a certain group of keys may unlock said lock if the guard means corresponding to that group of keys is operatable and operated.

9. In a watchman's tour system, a key, a register comprising a cylinder lock operatable by said key, means driven by said lock, a guard means rendered operative by said means for permitting operation of the lock by the key, and means for locking said lock and unlocking said lock under the control of said guard means whereby said key may unlock said lock if the guard means corresponding to said key is operated.

10. In a watchman's tour system, a plurality of groups of tour stations arranged to create a watchman's tour, each group of stations including preliminary stations and a transmitting station, each preliminary station comprising a key and guard means and each transmitting station comprising a key, a guard means and a transmitting circuit controlled by the key and guard means, each key within each group being individual to its station, the keys of respective stations in each group being identical, the guard means in each group of stations being in different angular relation with said key, and a watchman's register for compelling the completion of a tour by the watchman comprising a lock operable through a number of cycles each of which includes a series of successive positions, each position requiring operation of the register by a particular key for advancing the lock to its next position, a plurality of guard means therein equal in number to the number of groups of tour stations, each of said guard means being operable only by the guard means in one group of stations, means controlled by said lock as it is operated through each of its successive positions for locking its guard means, and means for unlocking each of said guard means in said lock in predetermined sequence whereby they may be operated by the guard means at each tour station if the watchman proceeds from group to group in a predetermined sequence and additional locking means in said register operated by said unlocking means whereby operation by the proper key and guard means conditions said lock for operation at a predetermined subsequent station.

11. In a watchman's tour system, a plurality of groups of tour stations arranged to create a watchman's tour, each group of stations including preliminary stations and a transmitting station, each preliminary station comprising a key and guard means and each transmitting station comprising a key, a guard means and a transmitting circuit controlled by the key and guard means, the guard means in each group of stations being in different angular relation with said key, and a watchman's register for compelling the completion of a tour by the watchman comprising a lock operable by the keys and guard means through a number of cycles each of which includes a series of successive positions, a plurality of guard means therein for locking said lock each of which is operatable by only the guard means in a particular group of stations, means controlled by said lock as it is operated through each of its successive positions for locking its guard means, and means for unlocking each of said lock guard means in predetermined sequence whereby they may be operated by the guard means at each tour station to unlock the lock if the watchman proceeds group to group in a predetermined sequence.

12. In a watchman's tour system, a plurality of groups of tour stations arranged sequentially to create a watchman's tour, each station comprising a key and guard means, and a watchman's register for compelling the completion of a tour by the watchman comprising a lock operable by the keys and guard means through a number of cycles each of which includes a series of successive positions, guard means therein for locking said lock and operatable in the same sequence as said stations, means controlled by said lock as it is operated through each of its successive positions for locking said lock guard means, and means for unlocking said lock guard means in predetermined sequence whereby it may be operated by the guard means at each tour station to unlock the lock if the watchman proceeds from one group to another in a predetermined sequence.

13. In a watchman's tour system, a plurality of tour stations arranged to create a watchman's tour and including preliminary stations and transmitting stations, each preliminary station comprising a key and each transmitting station comprising a key, a guard means and a transmitting circuit controlled by the key and guard means, and a watchman's register for compelling the completion of a tour by the watchman comprising a lock operable by the keys, guard means in the lock for locking it, means controlled by said lock as it is operated by the keys for locking the guard means, and means for unlocking said guard means whereby it may be operated by the guard means at each transmitting station if the watchman proceeds from one group to another in a predetermined sequence.

14. In combination, a watchman's register comprising a lock having a plurality of spaced guard pins therein extending to the outside thereof, means controlled by the lock for locking said pins in such a position that they are flush with the end of the cylinder, a watchman's station comprising a key for operating the lock, a pair of transmitting contacts in the station adapted to be operated by said register, a second pair of contacts connected in series with the first pair of contacts for completing the transmission circuit, means aligned with and controlled by a particular pin in said register and engaging the second pair of contacts whereby the second pair of contacts are held in open position if the pin within the register is locked and in closed position if the pin is unlocked and means controlled by the said locking means and the lock for selecting and unlocking said particular pin if said key operates the lock.

15. In combination, a watchman's register comprising a lock having a plurality of guard pins therein extending to the outside thereof, means for locking said pins in such a position that they are flush with the end of the cylinder and a watchman's station comprising a key for operating the lock and selecting one of the pins to unlock it to allow the pin to recede within the cylinder, a pair of transmitting contacts adapted to be operated by said register and key, a second pair of contacts connected in series with the first pair of contacts for completing the transmission circuit, contact operating means controlled by the pin in said register and engaging the second pair of contacts whereby the second pair of contacts are held in open position if the pin within the register is locked and in closed position if the pin is unlocked.

16. In combination, a watchman's register comprising a lock having a plurality of guard pins, means for locking said pins, a plurality of preliminary stations and a plurality of transmitting stations connected to a transmitting circuit each station comprising a key for operating the lock and selecting a predetermined guard pin to allow the pin to operate, a pair of transmitting contacts adapted to be operated by said key, means for guarding the transmission circuit, means controlled only by the predetermined guard pin for controlling the guarding means whereby transmission of signals is prevented if the predetermined guard pin has not been unlocked.

17. In a watchman's tour system, a plurality of stations divided into groups, one station of each group being a transmitting station, a register comprising a lock having a rotating cylinder therein which is rotatable by key operation at each station of each group, a station cylinder geared to the rotating cylinder and operated by the rotating cylinder and a series of guard pins controlled by the station cylinder, each of which prevents operation of a particular transmitting station until a predetermined group of stations has been operated.

18. In combination, a watchman's tour register, a lock therein, a plurality of angularly spaced guard pins therein controlled by said lock, groups of preliminary stations for operating the register through a sequence of operations resulting in the unlocking of one of the guard pins per group and a transmitting station in each group of preliminary stations, each transmitting station comprising a drawer for identically positioning the register and a contact operating member aligned with a particular guard pin.

PAUL M. FARMER.
DWIGHT W. BLOSER.